United States Patent
Costa et al.

[15] 3,679,272
[45] July 25, 1972

[54] AUTOMATIC ALIGNMENT BEARINGS FOR GUIDING IN TRANSLATIONAL OR ROTATIONAL MOTION

[72] Inventors: Charles Costa, Gradignan; Andre Loupere, Arcachon; Philippe Monsel, Pessac; Bertrand Schmitt, Bordeaux, all of France

[73] Assignee: Commissariat a L'Energie Atomique, Paris, France

[22] Filed: Feb. 2, 1971

[21] Appl. No.: 111,872

[30] Foreign Application Priority Data

Feb. 2, 1970 France..................................7003473

[52] U.S. Cl................................................................308/9
[51] Int. Cl.........................................................F16c 17/16
[58] Field of Search.......................................308/3, 3 A, 6, 9

[56] References Cited

UNITED STATES PATENTS 3,272,569   9/1966   Mergen......................................308/6

Primary Examiner—Martin P. Schwadron
Assistant Examiner—Frank Susko
Attorney—Cameron, Kerkam & Sutton

[57] ABSTRACT

A bearing which ensures automatic alignment of a part to be guided and comprises a stationary supporting frame, a core which is placed within the frame and provided with elements for securing the part, pistons fitted within cylinders which are formed in the frame and each open on the core. Each piston is applied against an oil chamber of small width by means of the piston face which is remote from the core. Each chamber is connected through a high pressure drop inlet to a reservoir which contains oil under pressure and is fitted with a compensation system for maintaining the pressure at a practically constant value.

5 Claims, 6 Drawing Figures

AUTOMATIC ALIGNMENT BEARINGS FOR GUIDING IN TRANSLATIONAL OR ROTATIONAL MOTION

This invention relates to bearings which ensure automatic alignment of the parts which they are intended to guide either in translational motion or in rotational motion.

In the case of guiding in rotational motion, the bearings can serve to guide rotating shafts, for example.

In the case of guiding in translational motion, the bearings in accordance with the invention find an application as guiding components to be incorporated in a vibratory test system for producing both transverse and longitudinal vibrations.

The bearings have the advantage of forming a single-unit assembly of small overall size. Moreover, guiding can be carried out by means of said bearings over a substantial range of travel (for example ± 125 mm) under the action of vibrations having frequencies of up to 50 cps or even higher values. Automatic compensation for play which exists at the time of assembly or develops as a result of wear as well as automatic alignment of parts can be ensured by means of said bearings, thereby reducing the time of assembly while providing a high degree of rigidity along the guiding axes of said parts. These advantages and properties had not hitherto been combined in bearings of the prior art.

More specifically, the present invention is directed to a bearing which ensures automatic alignment of a part to be guided, said bearings being essentially characterized in that it comprises a stationary supporting frame, a core which is placed within said frame and is provided at the top face thereof with elements for securing said part, pistons located in each case in a cylinder which is pierced in said supporting frame and has its opening on said core, an oil chamber having a small width and each piston face remote from the face which is directed towards said core being applied against said oil chamber, each chamber being connected by means of a high pressure drop inlet orifice to a reservoir which contains oil under pressure and is fitted with a compensation system for maintaining the pressure at a practically constant value.

In accordance with an embodiment which corresponds to the case in which the core is movable with respect to the stationary supporting frame (guiding in translational motion), said supporting frame is fitted with shoes and each shoe is applied against one of said pistons.

By way of example, each shoe is of the roller type in which the rollers are intended to run along a track of the movable core.

Each shoe aforesaid can also be a sliding shoe.

Further characteristic features and advantages of the present invention will become apparent from the following description in which a number of different forms of construction of the bearing according to the invention are given by way of explanation but not in any limiting sense, reference being made to the accompanying drawings, wherein.

Figure 1:
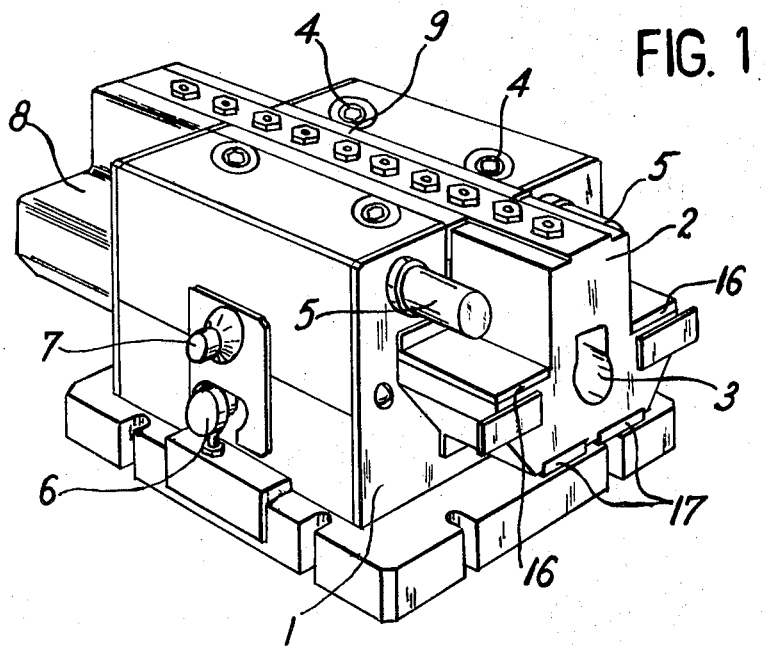
FIG. 1 is a view in perspective showing a bearing in accordance with the invention of the type designed for translational guiding and having a core which is movable with respect to the supporting frame.
Figure 3:
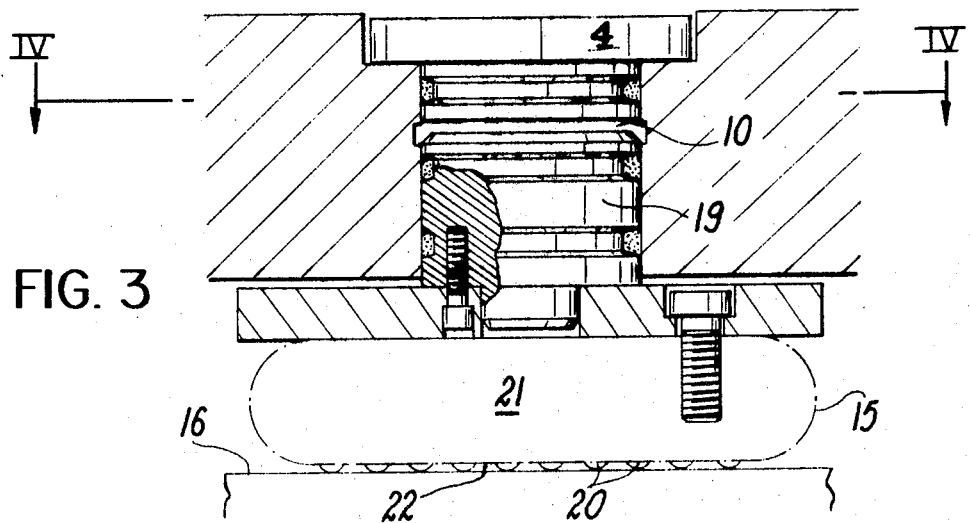
FIG. 3 is a sectional view showing one piston of the bearings of FIGS. 1 and 2 as well as the oil chamber and the shoe corresponding to said piston, said shoe being of the roller type.

The bearing which is illustrated in FIG. 1 is a long-travel or so-called T-bearing which performs a guiding function in one plane (for example a horizontal plane) while preventing any displacement in the direction at right angles to said plane. The shoes employed are assumed to be of the roller type as illustrated in FIG. 3.

Said bearing comprises a stationary supporting frame 1 and a core 2 which is housed within said frame and capable of moving with respect to this latter. Said core 2 has a bore 3 receiving the part to be supported and is fitted on the top face thereof with elements which serve to secure the part to be guided (not shown in the drawings).

FIG. 1 also shows other elements which will be described in greater detail hereinafter, namely the plugs 4 (of the cylinders which are formed within the supporting frame 1 and each of which contains one piston), the casings 5 of two compensation systems, a locking indicator knob 6, an adjustable bearing-pin (reference numeral 7), a hood 8 which covers the movable core 2 at one end of the supporting frame 1 (an identical hood is provided at that end of the supporting frame which is visible in the figure but is not illustrated in order to show the core 2 more clearly) and a top hood 9.

The movable core 2 which is formed of light alloy is slidably fitted within the stationary supporting frame 1.

The operation of the bearing is as follows (reference being made to FIGS. 1, 3 and 4):

The supporting frame 1 carries four roller-type shoes (shown in FIG. 3) which are secured to the base-plate of said frame and four roller-type shoes which are secured to the top portion of said frame.

It should evidently be noted that no strict limitation is imposed in regard to the number of shoes which may be provided.

Said shoes 15 are each mounted on a piston 19 and this latter extends into an oil chamber 10 of small width shown in FIG. 3) which constitutes a hydraulic spring. Variations in the volume of said chamber which arise from take-up of play are compensated by means of a communication through an orifice 11 having a high pressure drop (FIG. 4) with an oil reservoir 12 which is also under pressure. Said reservoir 12 is fitted with a compensation system which is located within a casing 5 (shown in FIG. 4) which serves to maintain the pressure within said reservoir at a practically constant value on the one hand in the case of expansion caused by a temperature rise and on the other hand in the presence of slight leakage.

Figure 4:
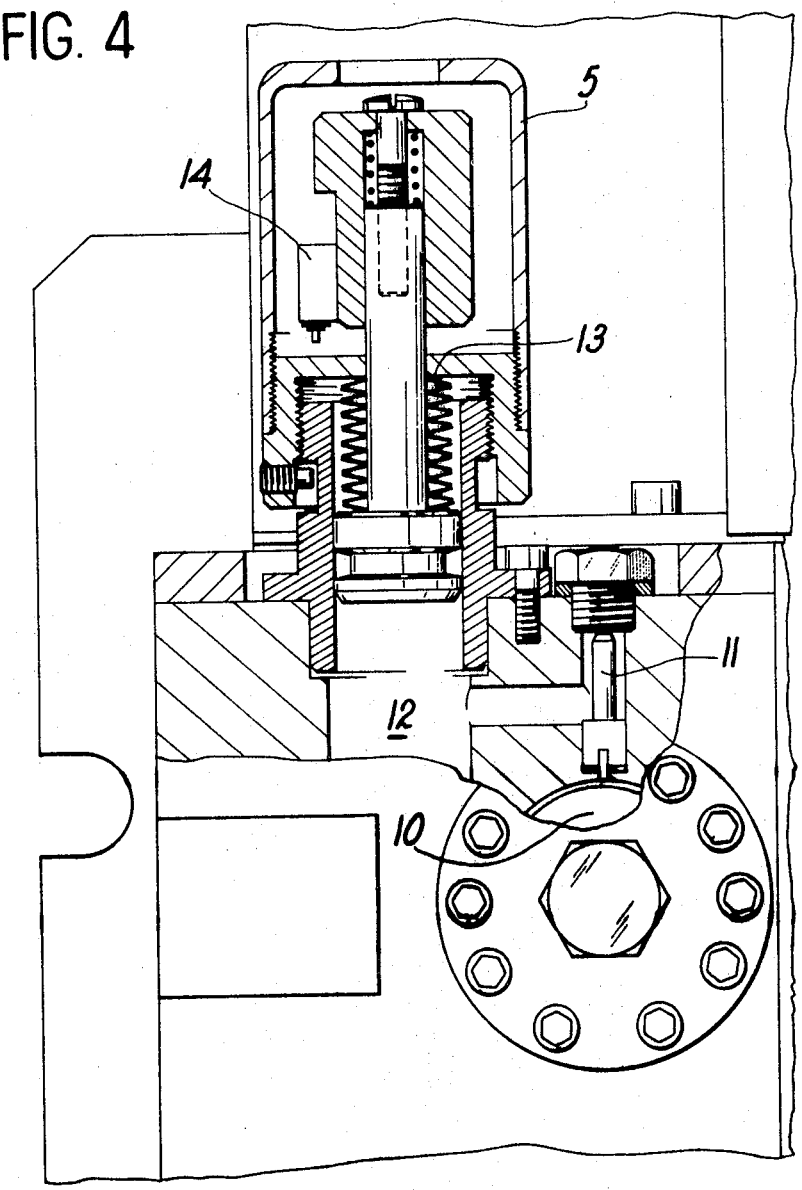
FIG. 4 is fragmentary view taken along line IV—IV of FIg. 3 and showing the oil chamber which is partially broken away and the corresponding oil reservoir together with its compensation system.

The amplitude of these two opposite corrections is a function of the setting which is chosen for this system and which is based on the compression of a spring having non-constant stiffness; in the example of FIG. 4, the spring consists of a stack 13 of Belleville washers having non-constant stiffness. A switch 14 serves to close a circuit when the pressure is no longer within the specified range, thereby actuating an alarm device (not shown) or even cutting-off the movement generator (hydraulic jack or machine-tool motor, for example).

A device 6 for locking the movable core 2 within the stationary supporting frame 1 serves to secure said core against further motion when this latter is in a central position within the supporting frame for the purpose of transportation and assembly operations. A switch (not shown) is controlled by the locking pin and closes a safety circuit (which is not illustrated) as long as the movable core has not been released.

The hoods 8 protect the tracks of the core 2 against impacts or projections of different kinds when said core is in the central position. Said tracks (as designated by the reference numerals 16 and 17 in FIG. 1) are ground with a fine surface finish and are in fact fairly delicate.

Figure 2:
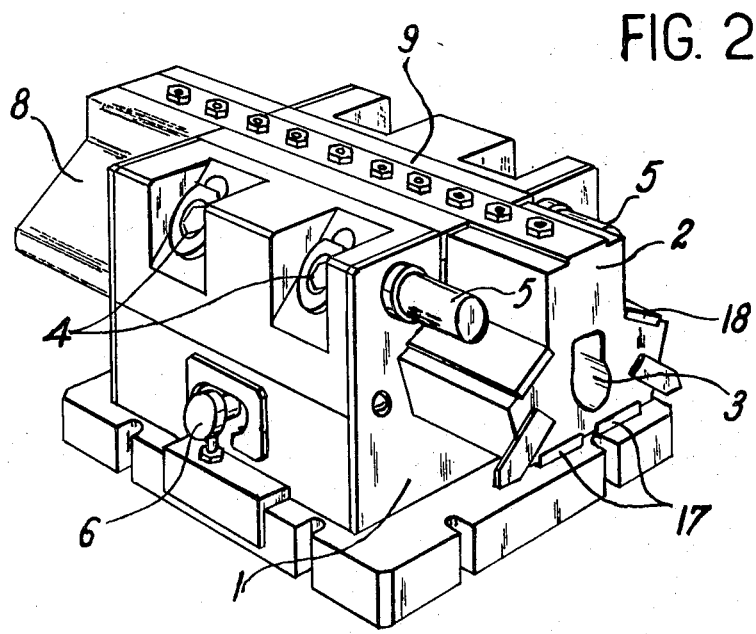
FIG. 2 is a perspective view showing an alternative form of construction of the bearing of FIG. 1.

The bearing which is illustrated in FIG. 2 is a long-travel or so-called V-bearing which ensures guiding along one axis (contained in a horizontal plane, for example) and prevents any displacement in directions at right angles to said axis.

The elements of the bearings of FIG. 2 which correspond to those of the bearing of FIG. 1 are designated by the same reference numerals.

The bearings of FIGS. 1 and 2 differ essentially in the shape of their movable cores 1.

The two top tracks 16 and two bottom tracks 17 of the T-bearing core (shown in FIG. 1 are parallel to each other and parallel to the base plane of the bearing.

On the other hand, the V-bearing core (shown in FIG. 2) has two bottom tracks 17 which are parallel to each other and to the base plane but the two top tracks 18 of said core are inclined at an angle of 45° to the base plane in order that guiding can also be carried out in sinusoidal motion in the horizontal plane.

The shoes 15 can be either of the roller type or of the sliding type. The shoe 15 which is illustrated in FIG. 3 is of the roller type: a chain formed of rollers 20 rotates about a core 21; the bearing portion of the chain runs between the track 22 of said roller-core and the track (16, 17 or 18) of the movable bearing-core 2.

The orientation of the pistons which support the top shoes is not the same in the case of the T-bearings as in the case of the V-bearings: the top pistons are vertical in the case of the T-bearing and inclined at an angle of 45° in the case of the V!-bearings. Transverse displacement of the movable core 2 of the T-bearings is therefore not prevented. It is for this reason that provision is made on said T-bearings for two adjustable bearing-pins 7 (only one of which is shown in FIG. 1), said bearing-pins being provided with a coating formed of material having a very high coefficient of friction in order to limit the displacement of the core during handling and adjustment operations.

Figure 5:
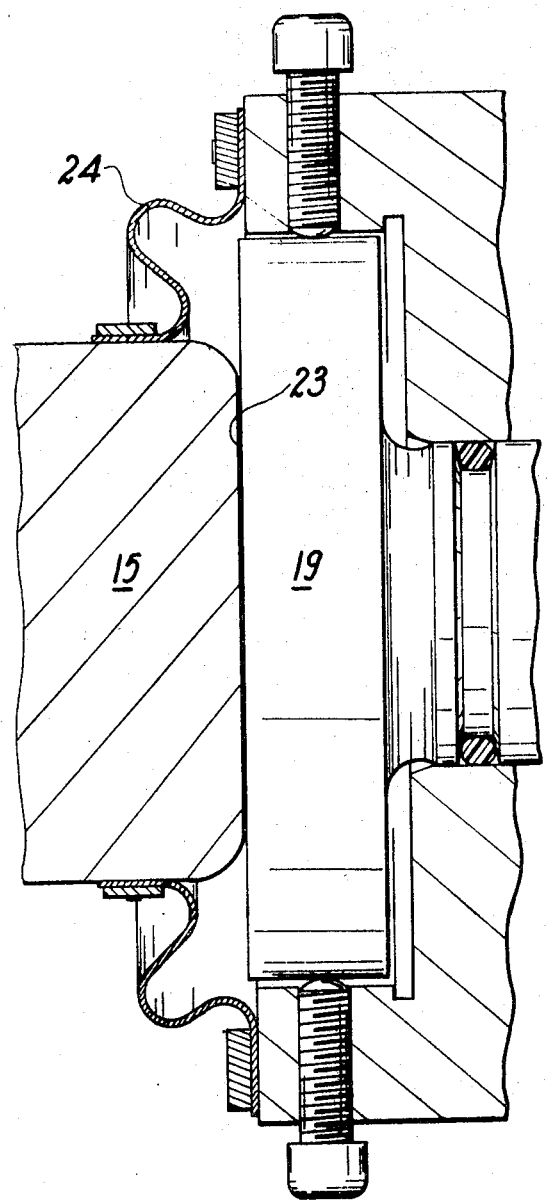
FIG. 5 is a sectional view showing one piston of the bearings (which are not illustrated) as well as the corresponding shoe which is of the sliding type.

In the example of FIG. 5, the faces 23 of the shoes of the sliding type are each in contact with a track which is formed directly on the piston 19. There is formed on each face a coating having a low coefficient of friction and a high PV index (the PV index being the product of the load pressure and of the relative velocity of displacement). The reference numeral 24 designates a protective diaphragm.

The orifice 11 which produces a high pressure drop (FIG. 4) and establishes a communication between the chamber 10 and the oil reservoir 12 provides the following advantages:

absence of dynamic return of oil towards the upstream end when the corresponding bearing is under dynamic load;
automatic compensation for play arising from assembly and from wear;
automatic alignment of the movable core 2;
elimination of backlash between the movable core and each shoe under the action of dynamic stresses exerted at right angles to the direction of displacement.

Moreover, by virtue of said orifice 11, all slight extraneous movements are attenuated and alignment is maintained even if temperature variations cause differential expansions between the different parts.

Automatic alignment is obtained as follows:

Coarse alignment to within ±0.2 mm, for example, is effected between the movable parts and stationary parts, the pressure having previously been reduced within the chambers; the pressure within said chambers is then restored.

Relative positioning of the stationary and movable parts is then carried out automatically and finally by adjustment of the height of the oil chamber 10.

Figure 6:
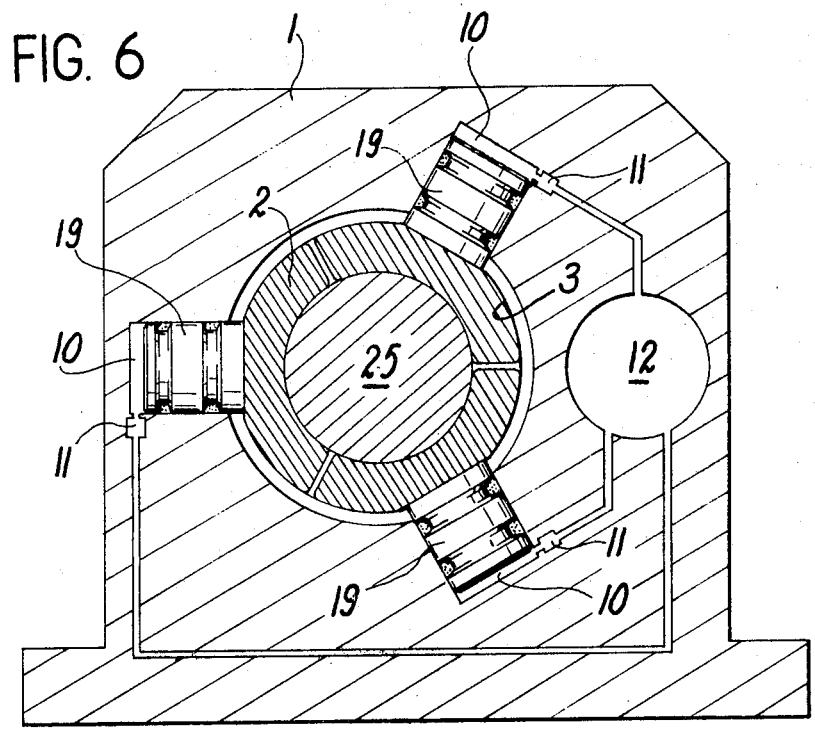
FIG. 6 is a sectional view showing a bearing in accordance with the invention which is of the rotational guiding type and carries a rotating shaft.

FIG. 6 illustrates a bearing in accordance with the invention of the rotational guiding type. A shaft 25 is rotatably mounted within said bearing, the core 2 of which is stationary with respect to the supporting frame 1, contrarily to the case of the bearings of FIGS. 1 and 2.

Said bearing is applied by means of seatings formed on the external surface thereof against pistons 19 which slide within bores of the supporting frame 1.

As in the previous embodiments, each piston terminates in an oil chamber 10 of small width which is turn communicates with the oil reservoir 12 by means of an orifice 11 which produces a high pressure drop.

What we claim is:

1. A bearing which ensures automatic alignment of a part to be guided, wherein said bearing essentially comprises a stationary supporting frame, a core which is placed within said frame, a bore in said core receiving the part to be guided, pistons located in each case in a cylinder which is pierced in said supporting frame and has its opening on said core, an oil chamber having a small width and each piston face remote from the face which is directed towards said core being applied against said oil chamber, each chamber being connected by means of a high pressure drop inlet orifice to a reservoir which contains oil under pressure and is fitted with a compensation system for maintaining the pressure at a practically constant value.

2. A bearing according to claim 1, wherein the core of said bearing is movable with respect to the stationary supporting frame (guiding in translational motion), said supporting frame being fitted with shoes and each shoe being applied against one of said pistons, guiding in translational motion being effected by said bearing.

3. A bearing according to claim 2, wherein said shoes are roller-type shoes, said rollers being displaceable on a track of the movable core.

4. A bearing according to claim 2, wherein said shoes are sliding shoes.

5. A bearing according to claim 1, wherein the core of said bearing is stationary with respect to the supporting frame and serves to guide a part in rotational motion.

* * * * *